Nov. 12, 1946.　　　W. R. TUCKER　　　2,410,909
UPWARD ACTING MOLDING PRESS
Filed April 28, 1944
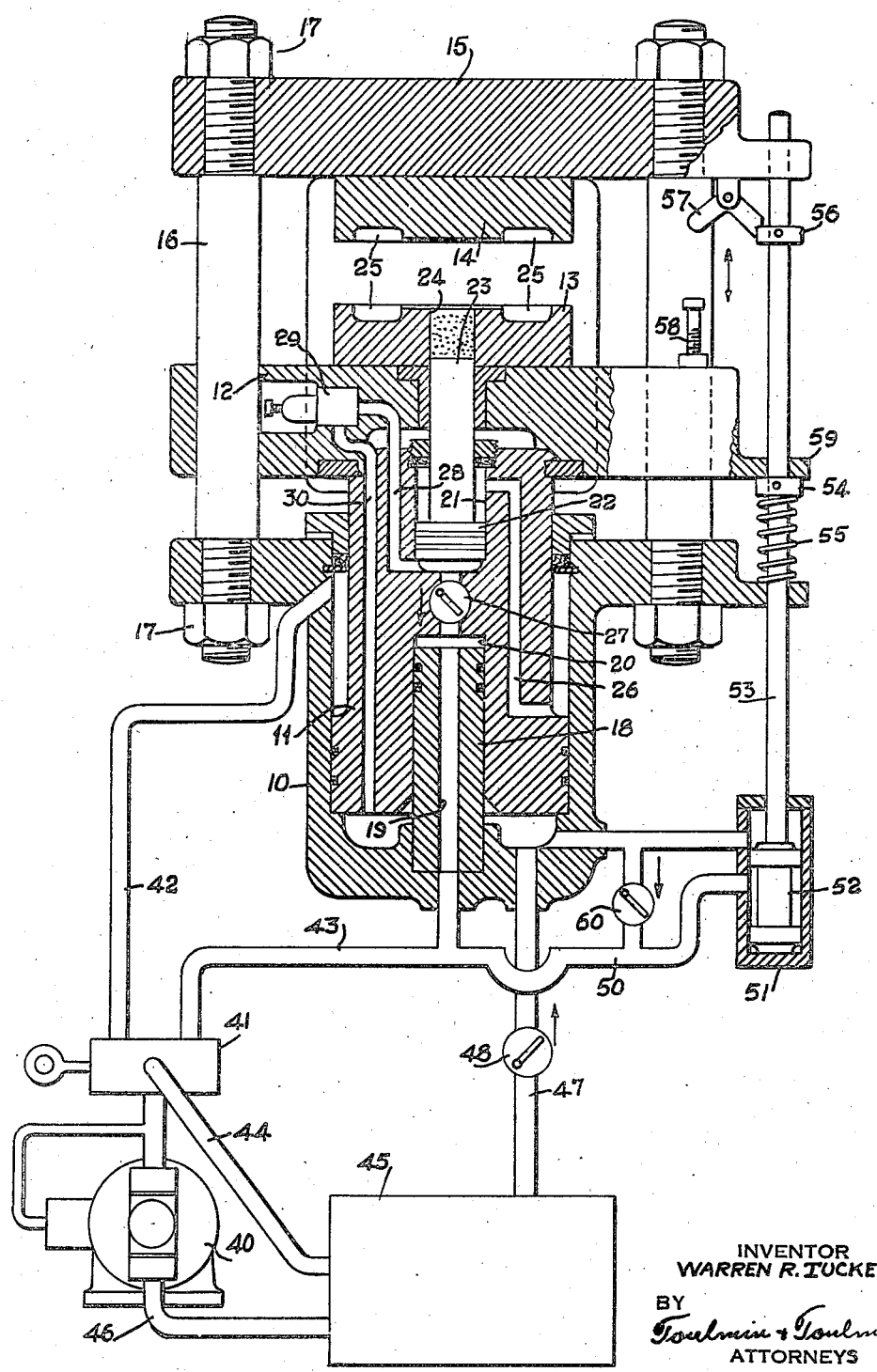
INVENTOR
WARREN R. TUCKER,
BY
Toulmin & Toulmin
ATTORNEYS Patented Nov. 12, 1946

2,410,909

UNITED STATES PATENT OFFICE 2,410,909

UPWARD ACTING MOLDING PRESS

Warren R. Tucker, Dayton, Ohio, assignor to H-P-M Development Corporation, Wilmington, Del., a corporation of Delaware Application April 28, 1944, Serial No. 533,105

4 Claims. (Cl. 18—30)

This invention relates to molding apparatus and, in particular, to a hydraulically actuated molding machine.

In the molding of plastics and similar substances the functions to be accomplished by a machine include the clamping together of mold halves or dies having cavities therein defining the shape of the workpiece to be formed and, the injecting into the said cavity moldable material.

Usually the functions of clamping the molds together and injecting the plastic therein are accomplished by separate units which may, if desired, be integrated by a timer or other suitable interlock so as to provide for a substantially automatic cycle. Also, the power units for supplying power for clamping and injecting are usually separate devices which may be mounted on a common base or frame.

The primary object of the present invention is to provide a molding machine wherein the functions of mold clamping and plastic injection are combined in a relatively simple structure.

It is another object to provide a hydraulic circuit for a machine of this type wherein the function of injection is positively and automatically sequenced relative to the function of clamping.

It is still another object of this invention to provide an improved hydraulic actuating system for a molding machine of this type.

These and other objects will become more apparent upon reference to the following description and the attached drawing, which is a sectional view of a molding press constructed according to this invention and provided with an improved hydraulic actuating system.

General arrangement

The general arrangement of the press and system of this invention, as shown in the drawing, comprises, preferably, an upward acting hydraulic ram to which is attached a platen. The platen is adapted to carry one of the pair of mold or die halves, the other of which is suitably stationarily supported on a fixed bed member.

The upward acting ram is bored to receive a reciprocating plunger, the function of which is to transfer or inject plastic into the cavities within the mold halves when the latter are closed together.

According to this invention, the pressure fluid for actuating the injection plunger is derived from the main area of the said upward acting plunger, thereby insuring that the mold halves are clamped together before the plastic is injected therein. The main plunger may, if desired, be fitted with a booster ram for the purpose of effecting the rapid closing of the mold halves at the beginning of a working cycle. A valve is provided which directs pressure fluid to the main clamping area of the upward acting ram when the mold halves are closed so as to maintain the same clamped together under full clamping force.

A pressure responsive valve is included in the hydraulic connection between the injection plunger and the main clamping plunger so that when the clamping pressure has reached the desired level the actuation of the injection plunger automatically follows. A second fluid connection is provided between the retraction areas of the two plungers so that when the mold halves are opened, the injection plunger automatically retracts also.

Detailed description

Referring more particularly to the drawing, the press according to this invention comprises a cylinder 10 within which is reciprocably mounted the double acting plunger 11. Attached to the end of the plunger 11 by any suitable means is a platen 12 which is adapted to carry a mold or die half 13. The die half 14 which is adapted to cooperate with the die half 13 is carried by the fixed press bed 15.

The bed 15 is rigidly secured to, and positively spaced from the cylinder 10 by means of the strain rods 16 and nuts 17.

The cylinder 10 and plunger 11 may be fitted with a booster ram 18 so as to provide for the rapid closing of the mold halves. The booster ram 18 is bored axially as at 19 to provide for fluid communication with the bore 20 in the plunger 11. The plunger 11 is also bored as at 21 to receive the injection plunger 22. The injection plunger 22 comprises a piston portion reciprocable in the said bore 21 and a reduced diameter portion 23 which extends through the platen 12 and enters a cavity 24 within the mold half 13. The cavity 24 is for the purpose of receiving the moldable material which is to be transferred or injected by the plunger 23 into the cavities 25 in the mold halves 13 and 14.

The upper end of the bore 21 is connected by a passage 26 with the smaller or retraction area of the plunger 11. The lower end of the bore 21 is connected through a check valve 27 with the booster bore 20. The check valve 27 permits fluid flow from the bore 21 to the bore 20 but not vice-versa.

The lower end of the bore 21 is likewise connected by a passage 28 with a valve 29 mounted in the platen 12. The valve 29 is connected by a passage 30 with the larger or advancing side of the plunger 11. The valve 29 is preferably an adjustable pressure responsive valve and is effective, upon the accomplishment of a predetermined pressure on the advancing area of the plunger 11, to establish fluid communication between the said advancing area of plunger 11 and the advancing area of the plunger 22.

For the purpose of supplying fluid pressure to the press, a pump 40 is provided which delivers pressure fluid to a distributing valve 41. The valve 41 is connected by a conduit 42 with the retraction side of the plunger 11 and, by a conduit 43 with the bore 19 of the booster plunger 18. A conduit 44 connects the valve 41 with a reservoir 45 from which fluid is drawn by the pump 40 through a conduit 46.

A conduit 47 which includes a check valve 48 interconnects the advancing area of the plunger 11 and the reservoir 45. The valve 48 permits free flow from the reservoir to the said advancing area but prevents the flow of fluid in the opposite direction. The purpose of this connection, which will become more apparent hereinafter, is to permit the filling with hydraulic fluid of the advancing chamber of the cylinder 10 during the initial rapid closing of the mold halves.

A conduit 50 which includes a two-way valve 51 connects the advancing chamber of the cylinder 10 with the conduit 43. The valve 51 includes a valve member 52 adapted, selectively, to establish or interrupt the continuity of the conduit 50. Attached to the valve member 52 is a rod 53 which passes through lugs provided on the bed and cylinder of the press. The rod 53 has attached thereto a collar 54 which is engaged by a spring 55 which tends to urge the said collar, together with the rod 53 and the valve member 52, upwardly. For the purpose of permitting the advancing chamber of the cylinder 10 to be exhausted when the valve 51 is closed, the said valve is bypassed by a conduit including a check valve 60 which permits fluid flow from the said advancing chamber but not vice-versa.

The rod 53 also has attached thereto a collar 56 which is adapted to be engaged by a latch member 57 which is effective to maintain the rod 53 and the valve member 52 in their downward position until the press platen 12 has reached a predetermined position during the advancing stroke thereof. An adjustable member such as the screw 58 is provided in the platen 12 for the purpose of engaging the latch 57 at the said predetermined position. The platen 12 likewise has an arm 59 formed thereon which engages the collar 54 and moves the same, together with the rod 53 and the collar 56, downwardly until the latch member 57 engages the collar 56 when the platen reaches a predetermined retracted position.

*Operation*

In operation, a charge of plastic or material to be molded, is placed within the cavity 24. The valve 41 is then shifted to deliver fluid into the conduit 43 and thence through the bore 19 into the bore 20 while simultaneously exhausting the retraction side of the plunger 11 through the conduits 42 and 44.

With the valve 41 so shifted, the plunger 11 moves upward rapidly until the screw 58 engages the latch 57 rotating the latter clockwise so as to release the collar 56 from engagement therewith. When the collar 56 is disengaged from the latch 57, the spring 55 is effective to move the rod 53 and the valve member 52 upwardly to establish fluid communication between the conduit 43 and the advancing side of the plunger 11. Preferably, the valve member 52 is shifted just prior to the actual closing of the molds so that the upward speed of the plunger 11 is substantially reduced thereby preventing any damage to the mold halves 13 and 14.

After the mold halves 13 and 14 have been engaged, the pressure on the advancing side of the plunger 11 builds up until the desired clamping force is developed by the said plunger. When the required pressure has been developed, the same is effective to shift the valve 29 to establish fluid communication between the passages 28 and 30 thereby permitting pressure fluid from the said advancing area to actuate the plunger 22 to accomplish the injection of the molding material into the cavities 25.

Upon the accomplishment of a dwell period, if desired, the plunger 11 is retracted to open the mold by shifting the valve 41 into position to deliver pressure fluid through the conduit 42 to the retraction area of the said plunger while simultaneously exhausting the booster bore 20 and the advancing area of the plunger 11.

When the plunger 11 retracts, the plunger 22 is also retracted by fluid conducted thereto through the passage 26. As the plunger 22 retracts the fluid on the advancing side thereof passes through the check valve 27 into the booster bore 20 from which it is exhausted as previously mentioned. As the platen 12 approaches its fully retracted position the arm 59 engages the collar 54 and moves the valve member 52 downwardly into the position shown in the drawing, at which time the member 57 engages the collar 56 thereby retaining the valve member 52 in its downward position until the platen again moves upwardly to actuate the said latch member. When the valve member 52 has been moved into position to interrupt fluid communication between the advancing chamber and the conduit 43, the check valve 60 is effective to permit the exhaust of fluid from the said advancing chamber.

It will be apparent that various modifications may be made in the structure and hydraulic circuit of the device shown in the drawing without in any way departing from the spirit of the invention. For example, the valve 51 could be operated by pressure established within the booster bore 20 without materially effecting the operation of the press. Likewise, the particular arrangement of valves and passages is only intended to be exemplary and does not represent the only possible arrangement.

It will also be apparent that this invention can be applied to a horizontally disposed molding machine as well as vertical machine without materially effecting the mode of operation of this invention. Also, it will be apparent that a press constructed according to this invention is not necessarily limited in scope to the molding of plastics but could as well be used for die casting of metals and similar operations.

Accordingly, it will be understood that I do not wish to be limited by the particular structure and arrangement shown in the drawing, but desire to comprehend such modifications thereof and substitution of equivalents as come within the scope of the appended claims and the invention.

Having thus fully described my invention, what I claim as new and desire to secure by Letters Patent, is:

1. In combination; a cylinder; a first plunger reciprocable in said cylinder; a bore in said first plunger co-axial with said cylinder; a second plunger reciprocable in said bore; valve means hydraulically connected with said first and said second plungers and operable in response to a predetermined pressure on said first plunger for establishing fluid communication between said plungers; and a fluid source for supplying pressure fluid to said first plunger for actuating the same, a first passage in said first plunger connecting one side of the same to one side of said second plunger, a second passage in said first plunger connecting the other side of the same to the other side of the second plunger, said valve means being located in said second passage, and means connecting said passages to said fluid source.

2. In a molding press; a double acting clamping ram; a central axial bore in said ram; a double acting injection plunger reciprocably mounted in said bore; means continuously hydraulically connecting the retraction side of said plunger with the retraction side of said ram comprising a first passage in said ram connecting one side of the same to one side of said injection plunger; a second passage in said ram connecting the other side of the same to the other side of said injection plunger; valve means in said second passage connected with the advancing side of said plunger and the advancing side of said ram and operable in response to a predetermined pressure on the latter for establishing fluid communication between said advancing sides; a third passage leading from said other side of said ram to said other side of said injection plunger and valve means therein operable during the retraction stroke of said plunger for bypassing said pressure responsive valve; and a source of pressure fluid connected to each of said passages and selectively operable for supplying fluid to the advancing or the retraction side of said clamping ram; whereby the supply of pressure fluid to the advancing side of said clamping ram is effective to move the same into clamping position and, subsequently, to actuate said injection plunger and the supply of pressure fluid to the retraction side of said clamping plunger is effective simultaneously to retract both said ram and said plunger.

3. The combination in a molding press having a stationary platen and a movable platen; of a double acting ram connected with said movable platen for clamping mold halves together; central axial bores extending into said ram from opposite ends thereof; a booster plunger extending into one of said bores; a double acting injection plunger reciprocable in the other of said bores and extending through said movable platen, a fluid source to supply actuating fluid to said booster plunger for rapidly closing said mold halves and to one side of said clamping ram for maintaining said mold clamped together said ram having a first passage connecting one side of the same to one side of said injection plunger; a second passage in said ram connecting its other side to the other side of said injection plunger; pressure responsive means in said second passage; a third passage extending through said booster plunger and said ram to said other side of said injection plunger; and a check valve in said third passage, said source being connected to said passages.

4. In a molding press having a stationary platen for supporting a stationary mold half and a movable platen for supporting a movable mold half; a double acting ram connected with said platen for actuating the same in mold closing and opening movements; central axial bores extending into said clamping ram from opposite ends thereof; a double acting injection ram reciprocable in the one of said bores adjacent said platen, a stationary booster ram extending into the other of said bores; and means of supplying actuating fluid sequentially to said rams for a complete molding cycle said last named means including a first passage in said ram connecting one side of the same to one side of said injection plunger; a second passage in said ram connecting its other side to the other side of said injection plunger, pressure responsive means in said second passage, a third passage extending through said booster plunger and said ram to said other side of said injection plunger; and a check valve in said third passage and a source of fluid connected to said passages.

WARREN R. TUCKER.